United States Patent Office 3,783,072
Patented Jan. 1, 1974

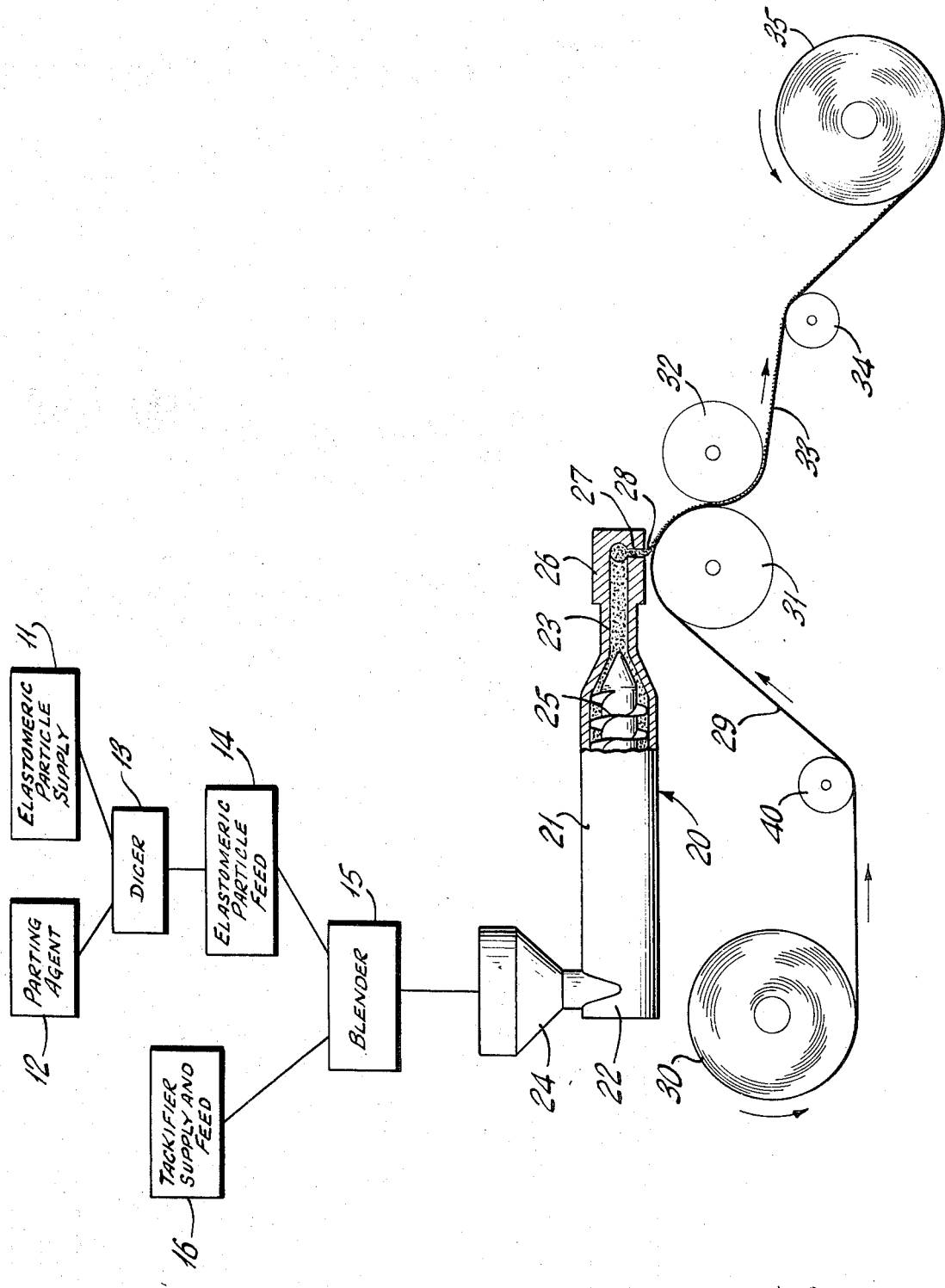

3,783,072
EXTRUSION PROCESS FOR PRESSURE-SENSITIVE ADHESIVE SHEETS AND TAPES
Ralf Korpman, Somerville, N.J., assignor to Johnson & Johnson, New Brunswick, N.J.
Filed Nov. 2, 1971, Ser. No. 195,016
Int. Cl. B29b 3/00
U.S. Cl. 156—244
10 Claims

ABSTRACT OF THE DISCLOSURE

The process for producing normally tacky and pressure-sensitive adhesive sheets and tapes by extruding an adhesive based upon a particular type of A-B-A block copolymer wherein the adhesive is extruded at a moderate temperature and at a controlled viscosity and then hot drawn to reduce its thickness substantially, i.e., as much as 20 or more times prior to laminating it with a backing sheet. In the block copoymer, A is a thermoplastic polymer block derived from styrene and B is an elastomeric polymer block derived from isoprene. Preferably, the block copolymer is particulate, and is blended with a tackifier resin in particle form prior to extrusion under conditions which allow the particle size of the respective components to be controlled.

---

The present invention relates to processes for producing normally tacky and pressure-sensitive adhesive sheets and tapes without the use of solvents and, more particularly, to such processes wherein the adhesive is heated above the melting point of its tackifying component and coated onto a backing sheet to form a laminate.

Attempts have been made to formulate thermoplastic compositions which may be applied as hot melts yet will be normally tacky and pressure-sensitive after cooling. These adhesives, if pressure-sensitive at all, only have been capable of a low level of performance in semi-tacky pressure-sensitive adhesive products such as label stock and the like. United States Letters Patent No. 3,239,478 discloses a new type of adhesive comprising an elastomeric and thermoplastic A-B-A block polymer, a solid tackifier resin and an extender oil. Although this adhesive is said to be capable of formulation as a hot melt adhesive at high oil contents, the resulting product possesses very poor properties and is unsatisfactory as a pressure-sensitive adhesive for most applications.

Another approach is suggested in United States Letters Patent No. 3,592,710 which describes a process for heating and mixing a particular formulation of elastomeric and thermoplastic block polymers and extruding the formulation at a relatively high die temperature, i.e., about 400° F. to form a pressure-sensitive adhesive film. According to this patent, the adhesive is coated between two sheets, i.e., a backing paper and a face paper, to produce a laminate which can be rolled up for storage and handling. Again, this is the type of product commonly used for producing labels having a facing sheet which is removed just prior to use. This adhesive possesses poor tack and hold properties and is not suited for normal industrial applications.

I have invented a process for extruding an improved adhesive formulation, based on a specific type of elastomeric and thermoplastic block copolymer which, for the first time, makes it possible to produce a pressure-sensitive adhesive tape by the extrusion process which possesses quickstick, hold and performance characteristics comparable to uncured solvent cast pressure-sensitive adhesive systems. In the process of my invention, the adhesive is extruded at a moderate temperature, i.e., not above about 350° F., preferably at 300–330° F., at a controlled viscosity, i.e., about 750,000–2,000,000 centipoises (measured at a shear rate of $10^{-1}$ seconds) and hot drawn to reduce its thickness substantially, i.e., at least about 5, in many cases 20 to 1 or more times prior to lamination with a backing sheet. In my process, the hot extruded and drawn film can be laminated directly with the backing sheet and then formed into a roll for storage without the need for a facing sheet. This is accomplished by urging, i.e., pressing, the hot adhesive film into close contact with the backing sheet using a specially prepared release roller to apply pressure directly to the face of the adhesive layer of the laminate, preferably using the offset nip which will be described more fully hereinafter.

It is important to control the viscosity of the extrudate as indicated to preserve the integrity of the film and prevent film failure due to splitting or breaking during hot drawing. In addition to controlling viscosity, the moderate extrusion temperature minimizes adhesive reversion on exposure to oxygen at high temperatures and allows faster production speeds, or throughput, since it minimizes the time needed for cooling prior to rolling up the tacky laminate.

My process employs an adhesive formulation which is substantially oil-free and comprises a specific type of thermoplastic elastomeric component and about 25–125 parts per 100 by weight of said elastomeric component of a tackifier resin component compatible therewith and having a melting point of at least about 105° F. and a number average molecular weight below about 1500, said tackifier being selected from solid fusable resins and a mixture of solid fusable resins with liquid resins. The thermoplastic elastomeric component comprises 75–100% of a thermoplastic and elastomeric block polymer of the structure A-B-A, wherein A is a thermoplastic polymer block derived from styrene, i.e., polymerized from styrene or styrene homologues, and B is an elastomeric polymer block derived from isoprene, i.e., polymerized from isoprene either alone or in conjunction with a small proportion of other monomers, and about 0–25% of an elastomer selected from homopolymers and random copolymers wherein one of the components is a diene. In my block copolymer, the individual A blocks have a number average molecular weight of a least about 7,000 preferably in the range of about 12,000–30,000 and the A blocks constitute about 8–35 and preferably about 12–25 percent by weight of the block polymer. The above described A-B-A block polymer may be used as the sole elastomeric constituent of the adhesive, and it is preferred that the elastomers consist essentially of this type of block polymer. However, as indicated above, the adhesive may include 0–25 percent by weight of the thermoplastic elastomeric component of an additional more conventional diene elastomer such as natural rubber, or polymers based on butadiene, isoprene, butadiene-styrene (SBR rubber), butadiene-acrylonitrile (NBR rubber), butyl rubber, or the like, and also may include other block polymers based on such diene elastomers.

Any conventional compatible solid tackifier or mixture of tackifiers such as rosin or rosin derivatives, polyterpenes, coumarone indenes, hydrocarbon resins, or the like, may be used. A preferred solid tackifier resin of this invention is a hydrocarbon resin derived from a $C_5$ stream of aliphatic petroleum derivatives and containing at least about 40 percent by weight of structures derived from piperylene and other dienes with the remainder derived from mono-olefins. Wingtack 95 resin offered commercially by Goodyear Tire and Rubber Company is an example of such a tackifier. This class of resins gives an optimum balance between tack and high temperature properties. The liquid tackifiers may be selected from liquid hydrocarbon resins and liquid rosin esters, or the like. In general, solid tackifier resins are those which are friable or brittle at about 75° F. and normally have softening points above about 140° F., whereas liquid tackifier resins are liquid at about 75° F. under otherwise normal ambient conditions. As indicated above, any mixture of solid and liquid tackifiers according to this invention must have a melting point of at least about 105° F. Furthermore, only minor amounts of liquid tackifier may be used in such a mixture.

Preferably, in the process of this invention, the thermoplastic elastomeric component and the tackifier resin component both are in the form of dry particles which are intimately blended prior to being charged into the extruder. It is very important in this embodiment of my invention that the average particle size of these two components be controlled with respect to one another. Using my adhesive formulation, the average cross dimension prior to blending of the thermoplastic elastomeric (block polymer) component should be about 2-6 millimeters and the size of the tackifier resin particles should be controlled so that the average cross dimension of a major proportion by weight of the tackifier resin component is about 4-10 millimeters and no more than about 35%, preferably less than 20%, by weight of said tackifier particles are capable of passing through a United States No. 12 Sieve having openings measuring about 1.68 millimeters in average cross dimension. The above stated particle size relationship is important to assure that the blended particles of both components melt uniformly and do not agglomerate or form lumps at the inlet or feed-in section of the extruder which will starve the extruder and cause uneven extrusion characteristics.

It is also preferred that a parting agent in the form of a nontacky powder be added to the said elastomeric particles to resist the tendency of these particles to agglomerate or form lumps during pulverization, as well as before and after they are blended with the tackifier particles. A variety of materials such as aluminum hydrate, zinc oxide, talc, titanium dioxide, or the like, are available but it is preferred to use a nonabrasive, inorganic powdered filler. Approximately 5–7% of the powdered parting agent by weight of the thermoplastic elastomeric component has been found to be desirable for this purpose, but higher quantities may be used if the powder also is intended to act as a filler in the resulting adhesive composition.

In this embodiment of my invention wherein the adhesive components are charged in the form of dry particles, it is important that the particle blend be fed into the inlet or feed section of the extruder at an extruder screw temperature substantially above the melting point of the resin particles, say above about 400° F. and preferably above about 450° F. This assures that the tackifier resin is melted quickly to provide a matrix for dissolving or dispersing the thermoplastic elastomeric particles before either type of particle has the opportunity to agglomerate. Thus, in this embodiment of my invention there is a temperature differential between the extrusion inlet and the die of at least about 50° F. and preferably at least about 100° F.

Although it is preferred that the thermoplastic elastomeric component and the tackifier resin component be charged together into the feed section of the extruder in dry particulate form, there are various other methods which may be employed to introduce these components to the extruder in accordance with this invention. For instance, the liquid resin portion of the tackifier component (if used) may be charged directly into the extruder by a side arm extruder or pump after the dry particles have been charged into the feed section. Similarly, either the dry tackifier resin particles alone or these particles together with a liquid tackifier may be introduced through a side arm extruder after the thermoplastic elastomeric particles are charged into the feed section. Another approach is to compound all the components in a separate step prior to charging the material into the extruder. For instance, the thermoplastic elastomeric and tackifier components may be mixed in a device such as a Banbury mixer which produces a mixture which then may be converted to solid strip form and fed into the extruder. Of course, this technique involves an additional step which adds to the cost of the process.

The process of this invention also contemplates that conventional additives may be used in the adhesive formulation for various purposes. For instance, antioxidants such as 2,5 ditertiary amyl hydroquinone and tertiary butyl cresol may be used as may conventional heat stabilizers such as zinc salts of alkyl dithiocarbamates. Ultraviolet absorbers also may be added to the adhesive when improved outdoor weathering is required. Conventional inorganic fillers, pigments and coloring agents such as zinc oxide, aluminum hydrate, carbon black, clay, calcium carbonate, titanium dioxide and others may be used to extend the adhesive and alter its appearance or physical properties. Most of these materials have been mentioned hereinbefore as possible parting agents. However, extender oils and similar materials in any appreciable amount must be avoided as additives in order to achieve the properties of pressure-sensitive products according to my invention.

The process of this invention produces pressure-sensitive adhesive products possessing superior tack and hold properties. Furthermore, the resulting adhesive layer is bubble-free and uniformly consistent in appearance and physical properties. The process is capable of extremely high production speeds and eliminates atmospheric pollution and fire hazards since no solvent is necessary to coat the adhesive. As a result, manufacturing costs are lowered substantially.

Other and further advantages of this invention will be apparent to one skilled in the art from the following description and claims taken together with the drawing, designated FIG. 1, which is in the form of a flow chart showing the preparation and blending of the particulate ingredients according to a preferred embodiment of the invention, combined with a schematic view, partly in section and partly in elevation, of equiment for extruding these ingredients and laminating the resulting adhesive with a backing sheet to form a normally tacky and pressure-sensitive adhesive sheet product in accordance with this invention.

Referring to the flow chart portion of FIG. 1, metering supply hoppers or similar devices 11 and 12 are provided for supplying metered quantities of the thermoplastic elastomeric ingredient (hereinafter for convenience sometimes called the elastomeric particles or the elastomer) and the powdered parting agent, respectively, to a pulverizing device or dicer 13 which reduces the size of the elastomeric particles as supplied. Typically, the elastomer in the form of the A-B-A block polymer of this invention is supplied in the form of relatively large particles ranging between 10 and 20 millimeters in average cross dimension. The dicer 13 mixes these particles with the powdered parting agent and reduces them in size to the neighborhood of 4 millimeters, i.e., about 26 millimeters, in average cross dimension, and the parting agent assures that these particles do not stick together or agglomerate in the dicer. The dicer 13, in turn, feeds the powdered elastomeric particles to a metering supply hopper 14 from which they are fed to a blender 15 which is adapted to gently blend the elastomeric particles with tackifier resin particles supplied to the blender by a metering hopper 16 in which the tackifier resin particles are loaded, and the blender is adjusted to feed the blended mixture of ingredients at the desired rate to the extruder 20. It is important that the blender 15 have a relatively gentle action in order to avoid the creation of excess resin fines, and a slow speed cone blender has been found satisfactory for this purpose. The various other materials such as antioxidants, pigments, etc., referred to hereinbefore, may be added to the formulation in minor amounts either at the blender or at the dicer.

The extruder 20 comprises an extruder barrel 21 having a feed-in section or inlet 22 at one end and an adapter or manifold 23 at the other end. The particulate ingredients are fed from the blender 15 into a feeding hopper 24 and from the hopper 24 into the inlet 22 of the extruder. Then the ingredients are thoroughly mixed and heated above the melting point of the tackifier resin particles to form a hot viscous mixture and the mixture is forced through the barrel 21 and the manifold 23 by pressure created through rotation of an extruder screw 25 mounted for rotation cantilever fashion in the barrel 21, until the hot viscous adhesive formulation reaches an extrusion die 26 connected to the manifold. The ingredients are heated by heat transferred from the extruder screw 24 and by heat generated by the extrusion process although the walls of the inlet portion of the extruder above the screw 25 may be cooled to avoid premature melting of the tackifier resin particles and thereby avoid lumping of the tackifier prior to reaching the screw. Finally, the hot viscous formulation passes through an elongated opening 27 extending transversely in the die 26. It should be noted that the extruder is shown only very schematically since its actual design is a good deal more complicated. For instance, as is known in the art, it is necessary to design screws for extruders of this type somewhat differently depending upon the exact viscoelastic properties of the material being processed, and both the screw 25 and the barrel 21 may include several sections both for feeding and mixing the ingredients. Similarly, since the control of temperature and pressure is of paramount importance in such a device, means may be provided all along the extruder for controlling the temperature and pressure of its various sections. These may include heating and cooling devices for controlling temperature and valves for controlling pressure, although the latter normally is controlled by the dimensions of the screw 25 and the barrel 21 and the clearances between them. Similarly, it is extremely important to control the size of the die opening 27 and the temperature of the extrudate at the die, since this not only determines the thickness of the extruded adhesive film at the die and the rate of extrusion, but to a large extent controls the pressure at that end of the extruder.

As indicated hereinbefore, it is important in this embodiment of the invention that the screw temperature at the extruder inlet or feed-in section 22 be maintained relatively high, i.e., above about 400° F., in order to assure that the ingredients mix thoroughly and to prevent the resin particles from agglomerating. From then on to the discharge end of the extruder at the manifold 23 the temperature is closely controlled as indicated above and is reduced substantially since the die temperature must be moderate, i.e., not above about 350° F., preferably 300–330° F., in order to control the integrity of the extruded film. This requires a temperature differential between the extruder inlet and the die of at least about 50° F. and preferably above 100° F. As is known in the art, the die temperature may be varied somewhat, i.e., raised or lowered, from that at the discharge end of the extruder of the inlet of the manifold 23. This may also be accomplished by conventional heating or cooling means.

The die opening is an elongated slot, shown in cross section in FIG. 1. The length of this slot 27 determines the width of the adhesive film and the width of the slot determines its initial thickness. It is preferred that the width of the die slot be adjustable to suit variations in the viscoelastic properties of the extrudate caused by variations of the ingredients of the adhesive. FIG. 1 shows a relatively thick adhesive film or curtain 28 passing downwardly through the die opening 27 and into contact with a backing sheet 29 passing over a driven laminating roller 31 positioned directly beneath the die 26. The backing sheet 29 is unwound from a supply roll 30 and drawn under an idling guide roller 40 before it reaches the laminating roller 31. The laminating roller 31 forms a nip with a specially designed driven silicone covered release roller 32 located away from the discharge end of the extruder. The extruded adhesive film, or curtain 28, as it is sometimes called, is hot and tacky and adheres to the backing 29 as soon as it contacts it. Thus, the tacky film may be stretched longitudinally by running the backing sheet over the laminating roller 31 at a linear speed higher than the linear rate of extrusion of the film. In the process of this invention, the linear speed of the backing sheet 29 is substantially greater than that of the extrusion rate in order to draw or stretch the adhesive film longitudinally so that its thickness is reduced at least about 5 times, i.e., to about 20% of the thickness of the film 28 at the die. However, as indicated hereinbefore, the film thickness may be reduced to about 5% of the thickness at the die, or even more greatly, depending upon the characteristics of the product being processed. This hot drawing step is important to this invention since it urges, i.e., pulls, the hot tacky film 28 into close adhering contact with the backing 29 and, at the same time, makes it possible to extrude the high viscosity adhesive formulation of this invention without creating undesirable back pressures in the extruder. As indicated hereinbefore, it is very important that the viscosity of the hot tacky extruded material be controlled so that the hot film 28 does not split or pull apart and maintains its uniformity during drawing and lamination, while at the same time controlling back pressures inside the die 26. This controlled viscosity of the extrudate should be about 750,000–2,000,000 centipoises measured at a shear rate of $10^{-1}$ seconds. While under certain conditions, and with some adhesive formulations according to this invention, it may be possible to obtain high enough anchorage between the extruded adhesive and the backing sheet simply by drawing the adhesive into close contact with the backing, it is preferred that the release roller 32 apply pressure directly to the adhesive side of the new laminate 33 to assure that the hot adhesive is pressed into intimate contact with the backing through any interstices it may possess in order to provide the high level of anchorage which normally is necessary between the adhesive layer and the backing in high quality pressure-sensitive adhesive tapes. However, since the adhesive is hot and tacky, the release roller must be specially designed for this purpose to provide the necessary release between the roller and the adhesive to prevent transfer of the adhesive onto the roller and other conditions which could cause jamming of the equipment. For this reason, it also is desirable that the equipment be designed to maximize the anchorage obtained between the adhesive and the backing sheet prior to reaching the nip between the laminating roller and the release roller, thereby minimizing the pressure necessary at this point to complete the lamination. The clearance between these two rollers and the pressure at the nip therefore is adjustable. Similarly, since under certain conditions it may be desirable to extrude the thick hot film or curtain 28 directly into the nip between the laminating roller 31 and the release roller 32, the die 26 and the rollers 31 and 32 are longitudinally adjustable with respect to one another so that the die slot 27 may be positioned directly over the nip or even slightly to the right of the nip, looking at FIG. 1. From the nip, the new laminate of adhesive and backing sheet is drawn partly around the release roller 32 and then around an idling guide roller 34 to a driven windup roll 35 on which the sheet is wound. The moderate temperature at which the adhesive is extruded minimizes the amount of cooling needed between the laminating and windup steps in order to allow the tape to be wound in the form of a roll without undesirable results.

The adhesive sheet on this windup roll can be stored in this form and subsequently slit into tapes of narrow width and rewound into smaller rolls of normally tacky techniques.

The following examples are given only by way of illustration and are not intended to limit the scope of the invention in any way. In the examples, all proportions are given in parts per one hundred parts by weight of the thermoplastic elastomeric component unless otherwise shown.

EXAMPLE I

A preferred adhesive in accordance with this invention is formulated from the following ingredients in particle form:

| Ingredient: | Parts |
|---|---|
| Kraton 1107 thermoplastic elastomeric component | 100 |
| Wingtack 95 tackifier resin | 80 |
| Antioxidants | 3 |
| Aluminum hydrate powdered parting agent | 6 |

Kraton 1107 is a thermoplastic elastomeric A-B-A block polymer of this invention offered by the Shell Chemical Company, wherein the styrene content (that of the A blocks) is about 12–15%, closer to 15% by weight of the block polymer and the polymer possesses a solution viscosity of about 2000 centipoises at 25% solids in toluene at room temperature (using a Brookfield viscometer with a number 4 spindle at 60 r.p.m.), and a number average molecular weight of about 110,000–125,000.

Wingtack 95 resin is a synthetic tackifier resin consisting predominantly of polymerized structures derived from piperylene and isoprene, with the ratio of piperylene to isoprene derived structures being at least about 8 or 9 to 1, and with the remainder being derived from mono-olefins. The said resin is polymerized from a stream of aliphatic petroleum derivatives in the form of dienes and mono-olefins having 5 or 6 carbon atoms all in accordance with the general teachings of United States Letters Patent No. 3,577,398. This resin possesses a melting point of about 95° C. and is offered commercially by Goodyear Tire and Rubber Company.

The Kraton 1107 is supplied in particles having an average cross dimension within the range of about 10–20 millimeters and is charged to the dicer together with the aluminum hydrate powder. The dicer 13 breaks the large elastomeric particles into smaller particles having an average cross dimension of between about 2–4 millimeters. Then, the powdered elastomeric particles are delivered to a blender in which they are gently mixed with the Wingtack 95 resin particles in such a way that no more than about 20% resin fines are created by weight of the total resin particles and the average cross dimension of the majority of the resin particles is about 4–10 millimeters. The antioxidants which are conventional materials of the type described hereinbefore also are added to the ingredients in the blender.

The complete formulation then is charged to the feed-in section of the extruder and the inlet screw temperature is maintained at about 450° F. The ingredients are thoroughly mixed in the extruder and passed through feeding, transition, and metering sections thereof until they reach the discharge end of the extruder barrel which is maintained at a temperature of about 310° F. and then passed through the die opening at a melt temperature of 325° F. and a viscosity of 1,150,000 centipoises measured at a shear rate of $10^{-1}$ seconds. The die slot is such that the initial thickness of the extruded film is about 20 mils. The hot and viscous film falls into contact with an impregnated creped kraft paper backing having a thickness of about 6.5 mils which is travelling much faster than the extrusion rate and thereby stretches the adhesive film and reduces its thickness to about 1.3 mils as it draws the film into adhesive contact with its top surface during passage of the paper around the laminating roller. The opposite or back side of the paper backing is backsized with a conventional release agent to assure that the adhesive will release from the back side of the backing when it's unwound from the rolls in which it will be formed. Then, the coated backing passes through the nip between the laminating roller and the release roller and the release roller contacts the hot adhesive and presses it into more intimate contact with the paper backing. Then, the resulting laminate passes further around the laminating roller and thence to the windup roll as described hereinbefore. The finished windup roll then is slit into pressure-sensitive adhesive tapes approximately 1" in width which, in turn, are wound upon themselves with the adhesive side of the tape facing inwardly to form small rolls from which the tape can be dispensed. The resulting adhesive tape possesses high tack and superior hold properties. The adhesive layer is smooth and uniform and completely free of bubbles. Thus, it not only possesses an excellent appearance, but has superior physical properties due to the continuity of its surface and the viscoelastic properties of the extruded adhesive formulation.

EXAMPLE II

The following adhesive formulation is mixed, extruded, coated and formed into tapes as described in Example I under substantially the same conditions:

| Ingredients: | Parts |
|---|---|
| Kraton 1107 thermoplastic elastomeric component | 100 |
| Foral 105 tackifier resin | 110 |
| Liquid ethylene glycol ester of hydrogenated rosin | 10 |
| Antioxidants | 3 |
| Aluminum hydrate powdered parting agent | 6 |

The resulting normally tacky and pressure-sensitive adhesive tape also possesses excellent appearance and physical properties as described in connection with the tape of Example I. Foral 105 tackifier is a pentaerythritol ester of a highly stabilized rosin having a melting point of 105° C. and offered by the Resins Division or Hercules, Inc. The liquid rosin is added by a side arm pump connected to the extruder.

EXAMPLE III

The following formulation is blended, extruded and made into tapes as described in the foregoing examples:

| Ingredients: | Parts |
|---|---|
| S-I-S block polymer (25% styrene) | 100 |
| Piccolyte S115 tackifier resin | 60 |
| Antioxidants | 3 |
| Aluminum hydrate powdered parting agent | 6 |

In this example the thermoplastic elastomeric component is an A-B-C block polymer wherein the styrene A blocks constitute 25% by weight of the polymer and the individual A blocks have a number average molecular weight of about 16,500. The isoprene B blocks possess a number average molecular weight of about 100,000. The Piccolyte S115 resin is a polyterpene resin of beta pinene having a melting point of 115° C.

This formulation is made into pressure-sensitive tapes under the same conditions described in Example I, except that the adhesive is drawn to a somewhat greater extent so that it is about 1 mil thick when laminated, and the backing to which it is applied is a film of polyethylene terephthalate also 1 mil thick. The resulting tapes possess excellent tack and superior properties at elevated temperatures.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. The process of manufacturing a normally tacky and pressure-sensitive adhesive sheet which comprises; heating and thoroughly mixing a thermoplastic elastomeric component and about 25–125 parts per one hundred parts by weight of said elastomeric component of a tackifier resin component compatible with said elastomeric component to form a hot viscous mixture, said thermoplastic elastomeric component comprising 75–100 percent of a thermoplastic and elastomeric block copolymer of the structure A-B-A, wherein A is a thermoplastic polymer block derived from styrene and B is an elastomeric polymer block derived from isoprene, said thermoplastic A blocks composing about 8–35 percent by weight of the block copolymer, and about 0–25 percent of an elastomer selected from homopolymers and random copolymers wherein one of the components is a diene, and said tackifier resin component having a melting point of at least about 105° F. and a number average molecular weight below about 1,500 and being selected from solid fusible resins and mixtures of solid fusible resins with liquid resins; applying pressure to said viscous mixture to cause it to be extruded through an elongated extrusion die to form a hot and tacky adhesive film and drawing said film while hot, but not above about 350° F., to reduce its thickness substantially while controlling the temperature of the mixture to maintain its viscosity at about 750,000–2,000,000 centipoises measured at a shear rate of $10^{-1}$ seconds; urging the hot drawn film into intimate contact with a backing sheet to cause the film to anchor firmly to said sheet and form a laminate therewith; and allowing the laminate to cool to form a pressure-sensitive adhesive sheet in which the tacky adhesive film is firmly anchored to the backing sheet.

2. The process of manufacturing a pressure-sensitive adhesive sheet according to claim 1 wherein; the thickness of the hot and tacky adhesive film is reduced during drawing to at least about 20 percent of its thickness at the die prior to drawing.

3. The process of manufacturing a pressure-sensitive adhesive sheet according to claim 2, wherein the thickness of said film is reduced to about 5–20 percent of its thickness at the die.

4. The process of manufacturing a pressure-sensitive adhesive sheet according to claim 1, wherein the thermoplastic component and the tackifier resin component are mixed in an extruder barrel connected to the die and said components are charged together into the feed end of the extruder.

5. The process of manufacturing a pressure-sensitive adhesive sheet according to claim 4, wherein the thermoplastic elastomeric component and the tackifier resin component both are in the form of dry particles and the said elastomeric component particles and the resin particles are thoroughly blended prior to being charged into the extruder.

6. The process of manufacturing a normally tacky and pressure-sensitive adhesive sheet which comprises; thoroughly blending a particulate thermoplastic elastomeric component and about 25–125 parts per one hundred parts by weight of said elastomeric component of a particulate tackified resin component compatible with said elastomeric component, said thermoplastic elastomeric component comprising 75–100 percent of a thermoplastic and elastomeric block copolymer of the structure A-B-A, wherein A is a thermoplastic polymer block derived from styrene and B is an elastomeric polymer block derived from isoprene, said thermoplastic A blocks composing about 8–35 percent by weight of the block copolymer, and about 0–25 percent of an elastomer selected from homopolymers and random copolymers wherein one of the components is a diene, and said tackifier resin component having a melting point of at least about 105° F. and a number average molecular weight below about 1,500 and being selected from solid fusible resins and mixtures of solid fusible resins with liquid resins; feeding the blended particles into the inlet of an extruder barrel at an inlet screw temperature above about 400° F. and substantially above the melting point of the resin particles; thoroughly mixing the thermoplastic elastomeric component and the resin component in said barrel to form a hot viscous mixture; applying pressure to said viscous mixture to cause it to be extruded through an elongated die at a temperature at least about 50° F. below the inlet screw temperature to form a hot and tacky adhesive film and drawing said film while hot to reduce its thickness substantially while controlling the temperature of the mixture to maintain its viscosity at about 750,000–2,000,000 centipoises measured at a shear rate of $10^{-1}$ seconds; uring the hot drawn film into close contact with a backing sheet to cause the film to anchor firmly to said sheet and form a laminate therewith; and allowing the laminate to cool to form a pressure-sensitive adhesive sheet in which the tacky adhesive film is firmly anchored to the backing sheet.

7. The process of manufacturing a pressure-sensitive adhesive sheet according to claim 6, wherein the thickness of the hot and tacky adhesive film is reduced during drawing to at least about 20 percent of its thickness at the die prior to drawing.

8. The process of manufacturing a presure-sensitive adhesive sheet according to claim 6, wherein the average cross dimension of the said thermoplastic elastomeric component particles is about 2–6 millimeters and the average cross dimension of a major proportion by weight of the tackifier resin component particles is about 4–10 millimeters, no more than about 35 percent by weight of said tackifier resin particles being capable of passing through a United States Series No. 12 sieve having openings measuring about 1.68 millimeters in average cross dimension.

9. The process of manufacturing a pressure-sensitive adhesive sheet according to claim 8, wherein no more than about 20 percent of the tackifier resin particles are capable of passing through the said No. 12 sieve.

10. The process of manufacturing a pressure-sensitive adhesive sheet according to claim 8, which comprises mixing a powdered parting agent with the thermoplastic elastomeric component particles prior to blending them with the said tackifier particles.

References Cited
UNITED STATES PATENTS

| | | | |
|---|---|---|---|
| 3,592,710 | 7/1971 | Yurgen et al. | 156—244 X |
| 3,239,478 | 3/1966 | Harlan | 260—29.7 R |
| 3,634,165 | 11/1972 | Gliniecki et al. | 156—244 |

EDWARD G. WHITBY, Primary Examiner

U.S. Cl. X.R.

156—338: 161—167; 260—29.7 R